United States Patent [19]

Zaccone

[11] Patent Number: 4,955,320

[45] Date of Patent: Sep. 11, 1990

[54] DISPENSER FOR STRING FOR BIRD NESTS

[76] Inventor: Samuel G. Zaccone, 1315 North 13th Avenue, Melrose Park, Ill. 60160

[21] Appl. No.: 315,494

[22] Filed: Feb. 27, 1989

[51] Int. Cl.⁵ .............................................. A01D 29/00
[52] U.S. Cl. ................................ 119/57.8; 119/51.01; 206/388
[58] Field of Search .................. 119/1, 51.03, 51.01, 119/52.2, 57.8; 206/388; 221/309, 310; 49/414

[56] References Cited

U.S. PATENT DOCUMENTS 2,931,336  4/1960  Cather ................................ 119/52.3
3,034,195  5/1962  Leclabart ............................ 206/388
3,124,103  3/1964  Stainbrook ........................ 119/52.3
3,466,800  9/1969  Nardulli ................................ 49/414

*Primary Examiner*—John Weiss
*Attorney, Agent, or Firm*—Edmond T. Patnaude

[57] ABSTRACT

A bird nest string feeder includes a housing having a hole therethrough the receiving one end of a bundle of string pieces. A retention element is movably mounted in the housing and is biased against the bundle to hold the string in place within the hole. The retention element is biased by the pull of gravity or a spring member.

4 Claims, 1 Drawing Sheet

DISPENSER FOR STRING FOR BIRD NESTS

The present invention relates to a new and improved device for providing a source of safe nest building material for use by birds constructing nests.

BACKGROUND OF THE INVENTION

When building nests, birds collect various types of natural materials such as grass reeds, straw and the like, and they also collect certain man-made materials such as string, and bits of cloth. Relatively long pieces of string have been known to endanger the lives of birds when they become tangled in it, and therefor, attempted use by birds of such materials should be discouraged. One way to do this is to make a supply of safe nest-building materials available to the birds during nest building time.

SUMMARY OF THE INVENTION

Briefly, there is provided in accordance with the present invention a new and improved string feeder for supplying individual pieces of precut lengths of string to birds for their use in building nests. In a preferred embodiment the device includes an attractive housing having a hole therethrough for receiving one end of a bundle of string pieces. A retention element is movably mounted in the housing and is biased against the bundle to hold it in place within the hole. Preferably, the retention member is pulled by gravity against the bundle and is, therefore, a relatively heavy metal piece. However, a spring mounted retention member may be used to replace the gravity operated retainer.

When in use, the string feeder is placed in the open where it is accessible to the birds which are likely to use the string. The strings are removable by the birds one by one from the bundle inasmuch as when one piece is grasped by a bird the remaining strings are held in the bundle by the friction between the remaining pieces of string resulting from the coefficient of friction of the string and the weight of the retention member resting thereon. Improved handling and loading of the string may be achieved by tying the bundle of strings together at one end and cutting the binding after the bundle has been loaded into the feeder.

BRIEF DESCRIPTION OF THE DRAWINGS

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 1:
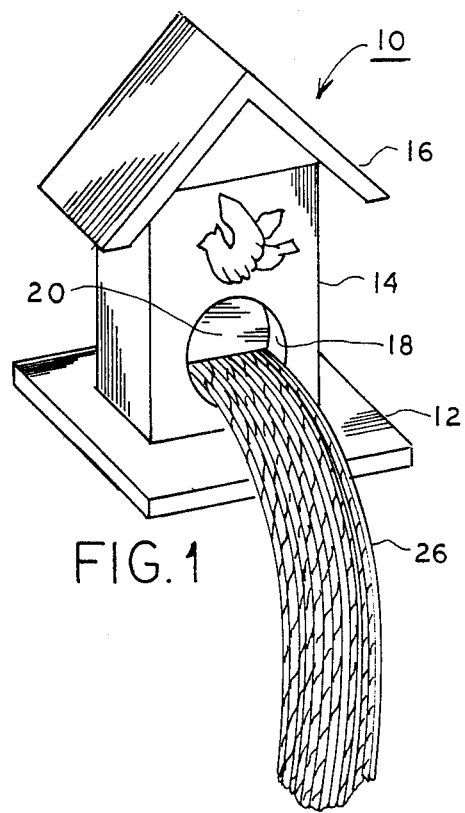
FIG. 1 is a perspective view showing a string feeder embodying the present invention.

Referring to FIG. 1, it may be seen that a bird nest string feeder 10 includes a flat base member 12 on which is mounted a housing 14 over the top of which a peaked roof 16 is mounted. The purpose of the peaked roof 16 is principally ornamental.

Figure 2:
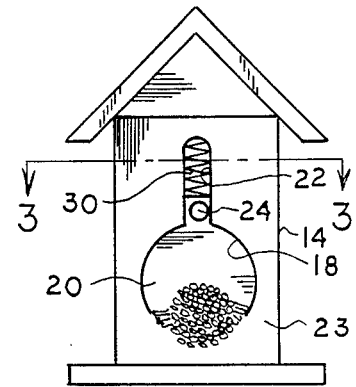
FIG. 2 is a rear elevational view of the string feeder shown in FIG. 1.
Figure 3:
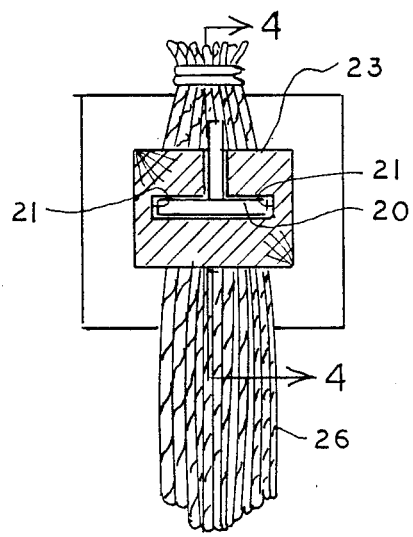
FIG. 3 is a cross-sectional view of the device of the present invention taken along the line 3—3 of FIG. 2.

A circular opening 18 extends completely through the housing 14 from the front as illustrated in FIG. 1 to the rear as illustrated in FIG. 2, and a string retention member 20 in the form of a relatively heavy flat metal plate is mounted in guide slots 21 in the housing 14 for free vertical movement therein. A vertical slot 22 is provided in the rear wall 23 of the housing 14 above the opening 18 to receive an arm 24 which is affixed to the retention plate 20 near the top thereof and projects a short distance rearwardly of the housing 14 to provide a finger grip extension to facilitate lifting of the plate 20 to an elevated position wherein the opening 18 is not blocked by the retention member 20.

Figure 4:
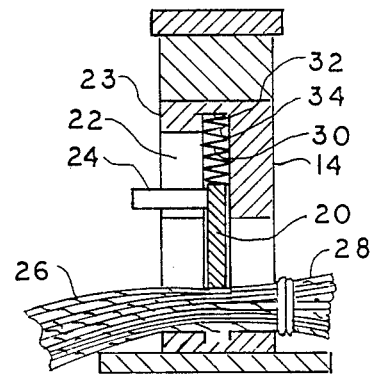
FIG. 4 is a cross-sectional side elevational view of the device of FIG. 1 taken along the line 4—4 of FIG. 3.

When the feeder 10 is used, the retention member 20 is lifted and a plurality of strings 26 are placed in the opening 18 below the retention member 20. When the retention member 20 is released it is pulled down by gravity and rests on the bundle of strings as best shown in FIG. 4. Preferably the pieces of string are a relatively short precut length of about eight to ten inches and the bundle may extend equally on both sides of the housing, or as shown in FIG. 4 the strings may be wrapped together to form a bundle with the wrapped end being disposed in proximity to the housing and the retention member 20 with the major length of the bundle extending from the other side or front of the housing. When a tied bundle of string is used, the bundle should be untied after being loaded in the dispenser so as to permit the individual pieces of string to be pulled out of the bundle. As shown in FIG. 4, the bundle of strings are wrapped together by another piece of string 28 tied around the outside of the bundle near one end thereof. Other wrapping materials such as tape may also be used.

Although a steel plate having a thickness of one eighth inch and of a square configuration or!e inch on a side, provides sufficient weight to permit removal of one string at a time from the device, should it be desired to use a retention member of a lesser weight, then a spring such as the coil spring 30 shown in FIGS. 2 and 4 may be positioned between the top of the retention member 20 and a surface 32 at the upper end of a blind hole 34 provided in the housing 14 above and to the rear of the slot 22 to receive the upper end portion of the spring 30. The spring is a compression spring and thus biases the retention member in a downward direction to press the strings against one another and against the bottom wall of the opening 18.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:
1. In combination
a bundle of pre-cut lengths of string,
a housing including an exterior wall having an opening therein,
said bundle extending into said opening in a direction transverse to said wall,
vertically disposed guide means in said housing, and
string retention means slidably carried in said guide means for vertical movement at least partially across said opening to engage said bundle and press same against a portion of said housing defining said opening.

2. The combination according to claim 1 comprising means wrapping said strings together at one end of said bundle in proximity to the location at which said string retention means engages said bundle.

3. A method of supplying nest building material to birds, comprising the steps of providing a bundle of precut pieces of string extending in mutually parallel relationship, providing a dispenser housing having a hole therethrough for receiving said bundle, inserting said bundle through said opening with one end of said bundle being in proximity to said dispenser and with the other end being disposed a substantial distance from said dispenser for access by said birds, and compressing said bundle between a retention member and said dispenser at a location in proximity to said one end.

4. A method according to claim 3, comprising the further step of tying said bundle of pieces of string together in proximity to said one end.

* * * * *